United States Patent
Dempski et al.

(10) Patent No.: US 9,424,106 B2
(45) Date of Patent: *Aug. 23, 2016

(54) SYSTEM FOR DISTRIBUTED INFORMATION PRESENTATION AND INTERACTION

(75) Inventors: Kelly L. Dempski, Evanston, IL (US); Brandon L. Harvey, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 188 days.

This patent is subject to a terminal disclaimer.

(21) Appl. No.: 12/707,128

(22) Filed: Feb. 17, 2010

(65) Prior Publication Data

US 2010/0185947 A1 Jul. 22, 2010

Related U.S. Application Data

(63) Continuation of application No. 10/981,994, filed on Nov. 5, 2004, now Pat. No. 7,711,681.

(51) Int. Cl.
*G06F 9/54* (2006.01)

(52) U.S. Cl.
CPC ............... *G06F 9/542* (2013.01); *G06F 9/546* (2013.01); *G06F 2209/544* (2013.01); *G06F 2209/545* (2013.01); *G06F 2209/546* (2013.01)

(58) Field of Classification Search
CPC .. G06F 9/542; G06F 9/546; G06F 2209/545; G06F 2209/544; G06F 2209/546
See application file for complete search history.

(56) References Cited

U.S. PATENT DOCUMENTS

| | | | |
|---|---|---|---|
| 4,393,283 A | 7/1983 | Masuda | |
| 5,239,641 A | * 8/1993 | Horst | G06F 11/1658 713/375 |
| 5,408,470 A | 4/1995 | Rothrock et al. | |
| 5,454,075 A | 9/1995 | Kudo | |

(Continued)

FOREIGN PATENT DOCUMENTS

| EP | 1 043 671 A | 10/2000 |
|---|---|---|
| JP | 07-104730 | 4/1995 |

(Continued)

OTHER PUBLICATIONS

International Search Report for counterpart international application No. PCT/EP2005/011556 (4 pages).

(Continued)

*Primary Examiner* — Daniel Kinsaul
(74) *Attorney, Agent, or Firm* — Brinks Gilson & Lione

(57) ABSTRACT

A system for distributed information processing and interaction includes a plurality of output devices arranged to produce a respective output portion of a system output, a plurality of application processors and a state server in data communication with the plurality of application processors. Each respective output portion is defined by context information. Each application processor is configured to process one or more respective application programs and is responsive to the context information. Each application processor is coupled with an associated respective output device for controlling the output device in producing the respective output portion. The state server provides the context information to the plurality of application processors. The architecture is extended to a more general system in which output devices produce a variety of outputs including device actuations, as well as video displays, and receive a variety of inputs.

20 Claims, 3 Drawing Sheets

(56) References Cited

U.S. PATENT DOCUMENTS

| | | | |
|---|---|---|---|
| 5,491,743 A | 2/1996 | Shiio et al. | |
| 5,712,995 A | 1/1998 | Cohn | |
| 5,956,046 A * | 9/1999 | Kehlet et al. | 345/502 |
| 5,987,557 A | 11/1999 | Ebrahim | |
| 6,215,498 B1 | 4/2001 | Filo et al. | |
| 6,240,526 B1 * | 5/2001 | Petivan | G06F 11/165 714/11 |
| 6,388,680 B1 * | 5/2002 | Bayrakeri | 715/744 |
| 6,501,441 B1 * | 12/2002 | Ludtke et al. | 345/1.1 |
| 6,574,674 B1 | 6/2003 | May et al. | |
| 6,680,714 B2 * | 1/2004 | Wilmore | 345/1.1 |
| 6,760,749 B1 | 7/2004 | Dunlap et al. | |
| 6,803,906 B1 | 10/2004 | Morrison et al. | |
| 6,803,912 B1 | 10/2004 | Mark et al. | |
| 6,888,536 B2 | 5/2005 | Westerman et al. | |
| 6,978,281 B1 | 12/2005 | Kruy et al. | |
| 6,983,227 B1 | 1/2006 | Thalhammer-Reyero | |
| 7,006,055 B2 | 2/2006 | Sukthankar et al. | |
| 7,054,963 B2 | 5/2006 | Betts-LaCroix et al. | |
| 7,082,398 B1 * | 7/2006 | Apple et al. | 705/10 |
| 7,103,844 B2 | 9/2006 | Jones et al. | |
| 7,130,885 B2 | 10/2006 | Chandra et al. | |
| 7,176,848 B1 * | 2/2007 | Dai et al. | 345/2.2 |
| 7,286,120 B2 | 10/2007 | Van Brocklin et al. | |
| 7,373,377 B2 | 5/2008 | Altieri | |
| 7,627,334 B2 * | 12/2009 | Cohen et al. | 455/456.3 |
| 2001/0034652 A1 * | 10/2001 | Kondo et al. | 705/14 |
| 2002/0113812 A1 * | 8/2002 | Walker et al. | 345/719 |
| 2003/0015632 A1 | 1/2003 | Dunn et al. | |
| 2003/0063073 A1 | 4/2003 | Geaghan et al. | |
| 2003/0078960 A1 | 4/2003 | Murren et al. | |
| 2003/0174202 A1 | 9/2003 | Eshkoli et al. | |
| 2003/0225832 A1 | 12/2003 | Ludwig | |
| 2004/0001048 A1 | 1/2004 | Kraus et al. | |
| 2004/0012573 A1 | 1/2004 | Morrison et al. | |
| 2004/0080504 A1 * | 4/2004 | Salesky et al. | 345/418 |
| 2004/0119662 A1 | 6/2004 | Dempski | |
| 2004/0178993 A1 | 9/2004 | Morrison et al. | |
| 2004/0193441 A1 | 9/2004 | Altieri | |
| 2004/0201628 A1 * | 10/2004 | Johanson et al. | 345/764 |
| 2004/0216163 A1 * | 10/2004 | Whitcomb | 725/74 |
| 2005/0017959 A1 | 1/2005 | Kraus et al. | |
| 2005/0030255 A1 * | 2/2005 | Chiu et al. | 345/1.3 |
| 2005/0052432 A1 | 3/2005 | Kraus et al. | |
| 2005/0077452 A1 | 4/2005 | Morrison et al. | |
| 2005/0134525 A1 | 6/2005 | Tanghe et al. | |
| 2006/0095360 A1 | 5/2006 | Apple et al. | |
| 2006/0100967 A1 * | 5/2006 | Grimaldi et al. | 705/400 |
| 2006/0101054 A1 | 5/2006 | Dempski et al. | |
| 2006/0179162 A1 | 8/2006 | Van De Sluis | |
| 2007/0179646 A1 * | 8/2007 | Dempski et al. | 700/83 |

FOREIGN PATENT DOCUMENTS

| | | |
|---|---|---|
| JP | 10-040065 | 2/1998 |
| JP | 2005-181637 | 7/2005 |

OTHER PUBLICATIONS

Written Opinion of the International Searching Authority for counterpart international application No. PCT/EP2005/011556 (6 pages).

E. Gamma, et al., Design Patterns: Elements of Reusable Object-Oriented Software, 1995.

Matshushita, Nobuyuki, et al., "HoloWall: Designing a Finger, Hand, Body and Object Sensitive Wall," *Proceedings of 10th Annual ACM symposium on User interface software and technology*, Banff, Alberta, Canada, 1997, pp. 209-210.

Ringel, Meredith, et al., "Barehands: Implement-Free Interaction with a Wall-Mounted Display," *CHI'01 extended abstracts on Human factors in computing systems*, Seattle, Washington, 2001, 6 pages.

Wilson, Andrew D., "TouchLight: An Imaging Touch Screen and Display for Gesture-Based Interaction," ICMI'04, Oct. 13-15, 2004, State College, Pennsylvania, 8 pages.

Wilson, Andrew D., "A Demonstration of TouchLight, an Imaging Touch Screen and Display for Gesture-Based Interaction," UIST'04, Oct. 24-27, 2004, Santa Fe, New Mexico, 2 pages.

Han, Jeff, "Multi-Touch Interaction Research", 2006, from http://mrl.nyu.edu/~jhan/ftirtouch/ 2 pages.

Morrison, Gerald D., Smart Technologies, "A Camera-Based Input Device for Large Interactive Displays", IEEE Computer Graphics and Applications, vol. 25, No. 4, pp. 52-57, Jul./Aug. 2005 (2 pages) from http://csdl2.computer.org/persagen/DLAbsToc.jsp?resourcePath=/dl/mags/cg/&toc=comp/mags/cg/2005/04/g4toc.xml&DOI=10.1109/MCG.2005.72.

NESTA (The National Endowment for Science, Technology and the Arts), "Music to the ears of DJs," *scenta*, published Jun. 2, 2005, 2 pages, from http://www.scenta.co.uk/music/features.cfm?cit_id=2620&FAArea1=customWidgets.content_view_1.

Scott, Mark, Public Relations Manager, "Mitsubishi Electric Research Laboratories Named Finalist for the 2003 World Technology Awards," News Release, Mitsubishi Electric Electronics USA, Inc., Cypress, Calif., Jun. 27, 2003, 1 page, from http://www.mitsubishielectric.com/news/2003/6-27-03_MERL_WTA_finalist.html.

E. Gamma, et al., Design Patterns: Elements of Reusable Object-Oriented Software, 1995, Mediator, pp. 273-303, XP002367378. http://www.gefanucautomation.com/services/press/pressrls.asp?id=50, dated Oct. 1998.

Kelly L. Dempski, "The Use of Broadcast Infrastructures for On-Demand Services" International Conference on Cross Media Service Delivery, May 31, 2003, Santorini, Greece.

Kelly L. Dempski, "Real Time Television Content Platform: Personalized Programming Over Existing Broadcast Infrastructures", Second Workshop on Personalization in Future TV (TV '02) at the Second International Conference on Adaptive Hypermedia and Adaptive Web-based Systems (AH 2002), May 28, 2002, Malaga, Spain.

Kelly L. Dempski, "Context-Sensitive eCommerce", 2000 Conference on Human Factors in Computer Systems (CHI 2000) Extended Abstracts, Apr. 1-6, 2000, The Hague.

Kelly L. Dempski, Brandon Harvey and Beata Korytkowski, "Multi-User Affordances for Rooms with Very Large, Interactive, High Resolution Screens", Computer Human Interaction Virtuality 2005 Apr. 2-7, 2005, Portland.

www.barcocontrolrooms.com, TransForm A, Barco Control Rooms, Belgium, Ref. No. RS99660 Nov. 2005.

Kelly L. Dempski, "Augmented Workspace: The World as your Desktop", First International Symposium on Handheld and Ubiquitous Computing (HUC '99), Sep. 27-29, 1999, Karlsruhe, Germany.

Edy S. Liongosari, Kelly L. Dempski and Kishore S. Swaminathan, "In Search of a New Generation of Knowledge Management Applications", ACM SIGGROUP Bulletin, Jul. 1999.

Adam B. Brody, Kelly L. Dempski, Joseph E. Kaplan, Scott W. Kurth, Edy S. Liongosari and Kishore S. Swaminathan, "Integrating Disparate Knowledge Sources", Second International Conference on the Practical Application of Knowledge Management (PAKeM '99), Apr. 21-23, 1999, London.

Vance Hilderman and Tony Baghai, On the Softer Side, S/W Reliability:Mission-Citical, "Avionics Hardware Must Now Meet Same FAA Requirments as Airborne Software", pp. 32-36, COTS Journal Sep. 2003.

Jupitor Fusion 980 Specifications, Jupiter Inc., 2003. Systems Inc., www.jupitor.com 6 pgs., Jupiter Systems, Inc., 2003.

Daniel W. Nagala, Future Recording Requirements and Capabilities in the Oil and Gas Industry, 13pp., International Symposium on Transportation Recorders, May 3-5, 1999.

Daniel W. Nagala, Future Recording Requirements and Capabilities in the Oil and Gas Pipeline Industry, Turing Science Fiction into Practical Applications, 5pp., International Symposium on Transportation Recorders, May 3-5, 1999.

Japan Patent Office Action dated Jul. 26, 2011 for corresponding Japanese Patent Application No. 2007-539514.

Office Action dated Dec. 5, 2013 from corresponding Canadian Application No. 2,585,277, 2 pages.

(56) References Cited

OTHER PUBLICATIONS

"Decision for Patent" mailed dated Feb. 7, 2012 for co-pending Japanese Patent Application No. 2007-539514 (with English translation).
Canadian Patent Office Examiner's Report dated Dec. 10, 2012 for pending Canadian Patent Application No. 2,585,277.
Gamme E et al., "Design Patterns: Elements of Reusable Object-Oriented Software," 1995, Addison-Wesley, One Jacob Way, Reading, Massachusetts 01867, USA, XP 002367378.
Office Action dated Aug. 21, 2013 for corresponding Indian Patent Application No. 649/MUMNP/2007, 4 pages.
Decision to refuse a European patent application issued in related application EP 05 810 786.3, dated Oct. 23, 2014, 4 pages.
Brief Communication regarding Oral Proceedings issued in related application EP 05 810 786.3, dated Oct. 23, 2014, 1 page.
United States Patent and Trademark Office Action dated Sep. 29, 2011 for co-pending U.S. Appl. No. 12/038,665.

* cited by examiner

SYSTEM FOR DISTRIBUTED INFORMATION PRESENTATION AND INTERACTION

RELATED APPLICATIONS

The present patent document is a continuation of application Ser. No. 10/981,994, filed Nov. 5, 2004, pending, which application is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to data processing systems. More particularly, the present invention relates to a system for distributed information presentation and interaction.

Distributed data gathering and processing systems allow the collection, storage and manipulation of large amounts of data, including real time data. Real time data is data that is updated and processed at the same rate at which it is received. Real time data may originate in a variety of sources. Examples include sensor networks in systems or environments to be monitored and radio frequency identification tag (RFID) tracking systems for inventory or assets. These and other related technologies have given organizations access to a wealth of real time information about all aspects of the organization's operation. These aspects include, for example, consumer behavior, competitor behavior, employee productivity, supply chain activity, manufacturing, shop floor activity and so on.

For large organizations, this information can be extremely valuable for making decisions or developing insights. In the aggregate, this information may reveal patterns or trends not otherwise immediately apparent. When processed over time, this information may reveal developments that may be used for future prediction. Gathering and managing large amounts of data can provide a new view of system status or operation.

However, the enormous volume of data and the density of inter-connections can make it difficult to easily visualize this information on standard workstations. A conventional workstation is based on personal computer-type technology and generally includes a processing device and a user interface including, for example, a display screen, a mouse or other input device. While multimedia capabilities can enhance the presentation of information, the small size and limited features of the conventional device make meaningful presentation of the information difficult.

Furthermore, the complexity of the data and the decision making processes necessitate a shared view and collaboration among multiple experts. Even with a large screen and multimedia capabilities, only a few people can see and interact with a conventional workstation simultaneously. If manipulation of a mouse or keyboard is required, only a single person can control the workstation while a limited number of other participants view the process.

One solution to both issues is to give experts access to an immersive environment with which they can view, share, and physically interact with the information. In one example, such an environment is made up of large, high resolution displays, personal digital assistants (PDAs) and three dimensional (3-D) displays, along with alternative interaction modalities such as touch-enabled screens, 3-D mouse, data gloves etc.

Due to constraints with both technology and form factor, such an environment requires a system that can distribute one logical application across multiple computers and display systems that make up the immersive environment. Such a system must handle distribution of both the visual display and the user interactions.

Adequate systems to provide the necessary capabilities have not heretofore been available. Currently there is no standard architecture, language or protocol for building applications that span multiple and possibly heterogeneous computers, multiple displays, possibly of different form factors, and multiple interaction modalities. Such applications have to be created from scratch with the application developer managing interaction among multiple computers, multiple displays and multiple interaction modalities. Some commercially available system are typically built using expensive video processors that allow information and graphical data to be displayed on a screen, but not necessarily as one cohesive application. Examples are available from Jupiter.com and are priced in the hundreds of thousands of U.S. dollars Accordingly, there is a need for an improved system and method which solve these identified problems.

BRIEF SUMMARY

By way of introduction only, the presently disclosed embodiments provide a system and method for distributed information processing and interaction. In one general embodiment, application processors respond to one or more software applications to produce outputs such that the respective outputs together form a system output. The individual processor outputs may be a display on a display device, operation of an actuator such as unlocking an electronic lock, or changing information in a database. The processor outputs may be as simple as a change in output data from the processor. Each change or output produced by a processor is a change in the local state of the respective processor as well as a change in the overall system state. Each change in state of an application processor is reported in a state change message to a state server.

The state server operates to synchronize the local states of the respective processors. The state server reflects received state change messages from one application processor to all other application processors in the system. Also, any system inputs are reported to the state server which again reflects the state change to all application processors. In this way, the application processors are maintained in synchronous states. Output changes in one processor that should be reflected in the outputs of other processors are done so, automatically and seamlessly, by reporting the change to the state server and reflecting the change to all other processors.

In a specific embodiment, each application processor drives a display device which produces one or more image tiles of a tiled output display. Each processor uses the state change messages from the state server to update state information for the entire display, even though the processor is responsible for displaying only a designated portion of the display. The assigned, designated portion of the display is the context of the processor. An input device detects user interaction with the display, similar to mouse movements and mouse clicks but, in one embodiment, hand motions in front of the display. Detected user interactions are reported to the state server and information about the user interactions is reflected from the state server to the application processors which produce the image. The image is updated based on the information from the state server.

DETAILED DESCRIPTION OF THE DRAWINGS AND THE PRESENTLY PREFERRED EMBODIMENTS

Figure 1:
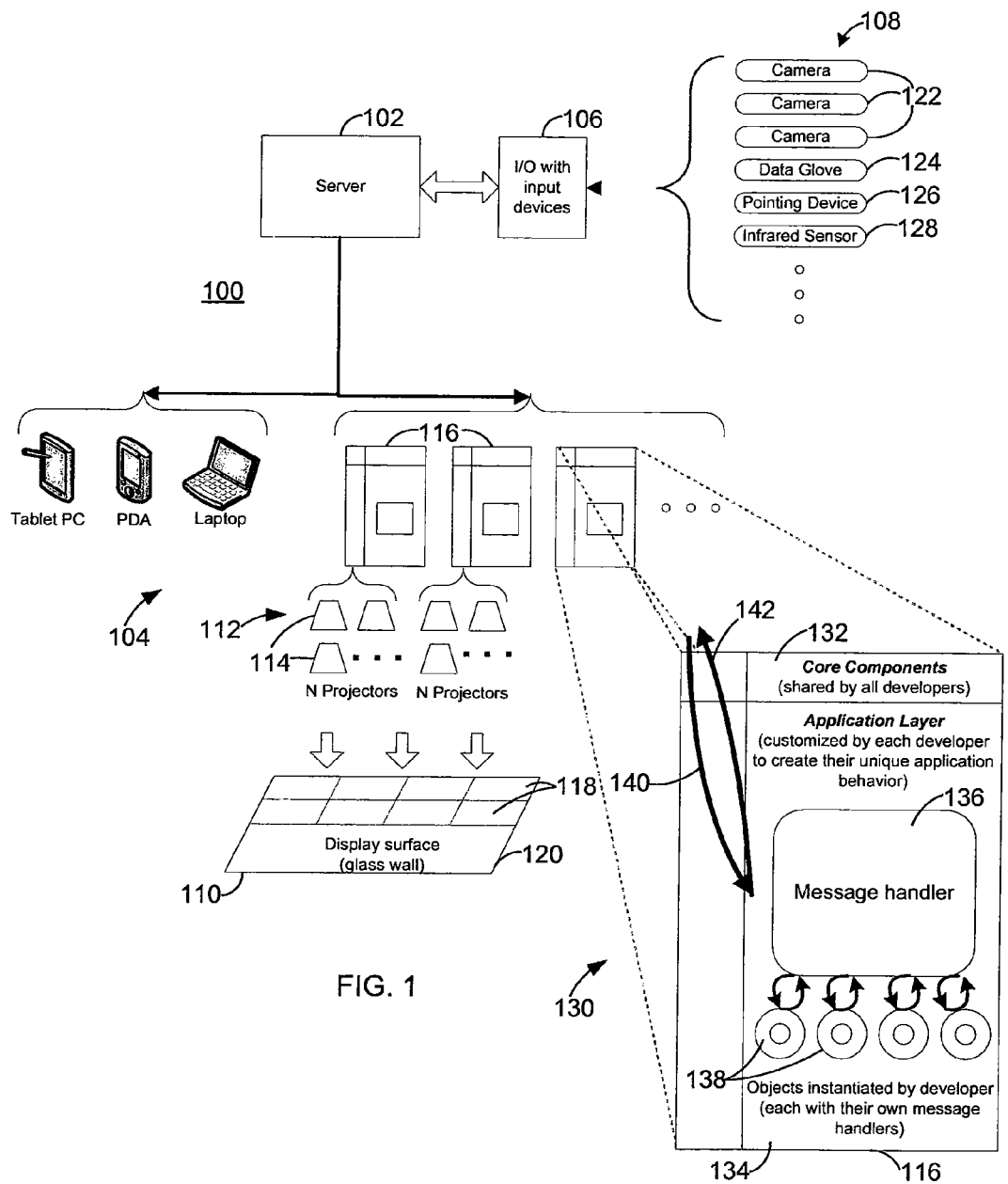
FIG. 1 is a block diagram illustrating architecture of a system for distributed information presentation and interaction.

The present embodiments provide a software architecture and a uniform abstraction layer that allows application developers to create data-intensive and collaborative applications without explicit concern for how the application might be distributed across multiple displays and computers within the immersive environment. This architecture is implemented through high-level primitives that consist of five mechanisms that: (a) divide an application or set of applications across multiple machines and multiple form factors, (b) provide mechanisms for aligning output portions such as display segments on different computers and/or different output devices, such as projectors, (c) provide means for collecting user interactions from multiple input devices which may be controlled by multiple machines, so that the application has a synchronized view of user interactions, (d) provide a communication/synchronization mechanism to enable multiple data-intensive and collaborative applications to execute and cooperate within a single computing environment, and (e) provide user interface constructs that enable multiple users of the application to interact with each other within the immersive environment.

The software architecture in accordance with these embodiments provides a uniform abstraction layer for constructing data-intensive and collaborative applications for immersive environments. The uniform abstraction layer frees application developers from managing low level details of the environment, thereby dramatically increasing their productivity and application quality. The innovation also enables application developers in developing data-intensive and collaborative applications for immersive environments.

The architecture is built to support applications in a distributed, immersive, multi-user environment; an environment that is not supported by typical desktop operating constructs. Therefore, the architecture is built to shield a developer from the complexities of the environment and allow them to write the end-user applications through a uniform abstraction layer. That layer assumes that any application might reside on more than one physical computer. It therefore provides transparent support for segmenting the application and synchronizing the segments. The developer creates the application as if it were a single process on a single computer. The architecture also assumes that several applications might be cooperating within a single environment or multiple locations. It therefore provides the messaging and synchronization mechanisms needed to maintain the overall environment, even across multiple platforms and modalities. Developers need only to make sure that each different application understands different states. Furthermore, the architecture assumes that there can be several input mechanisms and that one or more of the input mechanisms might allow multiple simultaneous inputs from one or more users. The architecture provides the end applications with a common synchronized view of all inputs. The developer needs only to map those inputs to state changes (based on application rules), which are in turn synchronized by the architecture. Finally, the architecture assumes that some end displays might be composed of multiple tiled projectors. In this case, the architecture supplies the software facilities needed to precisely align and blend the edges of multiple tiles. This must be done by the user at run time, but this complexity is hidden from the application developer. Details for each component are listed below:

Networked Messaging Component: The architecture automatically connects all applications to the centralized server that controls synchronization and messaging. The complexities of networking are hidden from developers and the architecture passes messages directly to the application. As a result, there is no distinction between local interactions (such as from an attached keyboard) and networked interactions (such as from a networked control device). Also, the developer handles messages in a manner that is very similar to a Windows "Message Map", but the architecture handles distributing the results of the message map to all computers. Messages can originate from applications or from dedicated user interface devices such as touch screens or data gloves.

Networked Time Synchronization: The architecture also ensures that all applications and/or application fragments have a common, synchronized time. This is crucial to animation and state management. In addition to the common time data, the architecture also supplies an "interpolator" class that can be used to manage state, animations, and any other time based data. Interpolator objects can be assigned start and end times, start and end values, and interpolation functions that determine how the values change over time. Once created, the interpolators supply time synchronized values to animations and other time sensitive features.

Application Fragmentation: Application developers can write single applications that place and animate objects on a single very large virtual canvas. Host computers each have a small data file that specifies what area of that virtual canvas they control. This is generally determined by the capabilities of the computer and the physical placement the screen. When the application runs on multiple machines, the architecture uses the data file to draw the appropriate portion of the canvas. The previous two features ensure that all fragments are synchronized and present themselves as one logical application.

Application Coordination: In some environments, especially those with different hardware platforms, several individual applications (as opposed to one fragmented application) might need to interact to provide a single working environment. This is also supported by the architecture. The architecture uses the Networked Messaging Component to message environmental state changes to all registered applications. Each application can respond according to its own criteria.

Screen Alignment: The architecture supports the use of tiled projected images to present display output. One inherent problem with tiled projection is that adjacent projectors must be carefully aligned and edge-blended to create a single contiguous display space. The architecture uses information in the data file mentioned above to determine whether or not the image must be aligned and how the alignment must be done. If alignment is necessary, the architecture loads a file with user-supplied alignment data and performs the necessary image warping on the application output. This feature can be extended to color correction between projectors. The details of the end display device are shielded from the application developer.

High Level Primitives: The architecture shields developers from the complexities of the underlying graphics technology with a set of common high level primitives. These primitives represent common objects such as 2D objects, 3D objects, lines, webcams, pictures, video, sound, text, graphs, and binary data objects.

Scene Encapsulation: Finally, application developers take advantage of the above features by creating instances of "Controller" objects that encapsulate all objects, data, and logic within a given "scene." The architecture will display the output of one controller at a time, making a controller nearly synonymous with "application" or "episode". However, controllers can also be nested and otherwise used to place objects into individual batches. This helps application developers distribute development efforts across several people. It also helps to increase overall graphics performance as different batches can be updated at different frequencies if necessary.

Referring now to the drawing, FIG. 1 shows a system 100 for distributed information processing and interaction. The system 100 includes a state server 102, a plurality of application processors or output devices 104 and an input/output (I/O) controller 106 with a plurality of input devices 108. The system 100 is an embodiment of an architecture that spans multiple, heterogeneous computer devices, multiple output devices and multiple modalities. The system 100 responds to inputs received from the input devices 108 to produce effects on the output devices 104. The effect produced may be identical for one or more output device, or the effect produced may be different depending on the effect and the particular output device. As will be described in further detail below, the effect produced on any one output device will depend on the nature of the output device and effect.

Generally, the state server 102 maintains the state or states of the system 100 and ensures that the output devices 104 are synchronized. The state server 102 communicates with the output devices 104 by sending messages, preferably with a predetermined message protocol. The state server 102 reflects all messages it receives about the system 100 back to all appropriate devices in the system, in particular, back to all the output devices 104. The state server 102 receives input signals from the input devices 108 and sends messages to the appropriate output devices 104 to synchronize the states of the output devices in a manner to be discussed in greater detail below. The input devices 108 may include any sort of sensor or data gathering device. The output devices 104 may include any sort of audio or video or other output device or system, including a personal computer (PC) such as a table PC, a personal digital assistant (PDA) or laptop computer or other specialized device or processor. The output devices 104 most generally include any type of actuator for causing an interaction or result in the environment.

The embodiment of FIG. 1 will be discussed in the context of an exemplary system in which a display image is controlled on a display surface 110 by the system 100. The display image is made up of a plurality of display devices 112. In the exemplary system, the display devices 112 are video projectors 114 under control of one or more respective application processors 116 arranged to project a display on panels 118 of a glass wall 120 forming the display surface 112. Any suitable number of projectors 114 and glass panels 118 may be used to form the display image. In the example of FIG. 1, a 2×4 array of projectors together form the display image on a similar array of glass panels 118. In other embodiments, other numbers of projectors and other numbers of glass panels may be used. In still other embodiments, other types of video display devices may be substituted, such as flat panel displays, plasma displays or cathode ray tubes. The principles described herein should not be limited by any particular technology by may be applied to the widest variety devices.

In the exemplary embodiment of FIG. 1, the input devices 108 include one or more cameras 122, a data glove 124, a pointing device 126 and an infrared sensor 128. As is indicated in the drawing other input devices similar to these or of other types may be added to the system 100. A camera 122 is a device which captures a video image. The image may be single images in any suitable format including digital formats such as jpeg (referring to a standard data format advanced by the Joint Photographic Experts Group) or gif (Graphics Interchange Format), or other, or the video images may be a motion picture image, such as a data file encoded according to a standard such as that proposed by the Motion Picture Experts Group (MPEG or one of its variants) or other standard. A data glove 124 is an input device for virtual reality and other data processing devices in the form of a glove which measures the movements of the wearer's fingers and transmits them to the data processing device or computer. Sophisticated data gloves also measure movement of the wrist and elbow, or other body part movements may be measured as well. A data glove may also contain control buttons or act as an output device, e.g. vibrating under control of the computer. The user usually sees a virtual image of the data glove and can point or grip and push objects. The pointing device 126 may be any data entry and manipulation device such as a computer mouse or pen tablet. The infrared sensor may be any sensing device that responds to heat, energy or radio emissions from a device to produce an image.

The I/O controller 106 serves as a data gathering interface between the system 100 and the input devices 108. The I/O controller 106 therefore is configured to receive signals from the respective input devices 108 and provide any necessary signals in return. For example, for receiving a jpeg format file from a camera 122, the I/O controller 106 receives a jpeg formatted file from the camera 122 and stores the file, providing appropriate network handshaking signals to the camera 122. In another example, the format may be streamed data from another camera 120 or from the data glove 124. The I/O controller 106 provides the necessary handshaking signals to the input device and stores the received data for viewing, or immediately provides the data to the state server 102. The I/O controller 106 receives data from the input devices 108, in the format provided by each respective input device, and formats the data to the format required by the state server 102 and the output devices 104.

In the exemplary embodiment in which a display image is controlled on a display surface 110 by the system 100, the input devices 108 include sensing devices to detect a user's hand or other body part adjacent the display surface and acting as a pointing device to manipulate a portion of the image. For example, in one embodiment, the input devices 108 include a set of cameras positioned adjacent the display surface 110 to detect position and movement of a user's hand and, in conjunction with the I/O processor 106, to provide signals to the state server 102 indicating the position and motion of the user's hand. The signals are conveyed to the respective application processors 116 and used to produce an appropriate display or change in the display. For example, if the hand motion should be interpreted as a left click, right click or other mouse actuation of the display on the display surface 110, each respective application processor 116 will respond appropriately by processing the hand motion and, if appropriate, reflecting the hand motion in the display portion controlled by the respective application processor.

As noted, the output devices 104 in this embodiment include one or more display devices arranged to display respective display portions of an output display of the system. To accomplish this, the glass panels 118 of the display surface 120 and their associated projectors 114 are tiled so that together they form a composite image. Each image produced by each projector is unique and is produced under control of the application processor 116 associated with the display device.

In general, the application processors 116 are general purpose data processing systems customized by particular application software to perform a particular function in the system 100. The application processors 116 are coupled by data links to the state server 102. These may be wireline or wireless data links, or any suitable data communication devices. The application processors 116 may include or have associated therewith particular hardware components for producing a particular output actuation. One exemplary actuation for a general purpose output device is opening an electrically controlled lock at a remote location. In such an application, the application processor 116 cooperates with a servo motor or other device to mechanically open the lock. In general, then, each application processor is configured to process an application program and is responsive to context information. Each respective application processor is in data communication with an associated respective output device 104 for controlling the output device 104 in providing an output portion of the system output. The system output is the aggregate of the output portions of all the output devices 104.

In the particular exemplary embodiment of FIG. 1, the application processors 116 are customized for processing respective display portions of an output display of the system 100. Accordingly, the application processors receive data and instructions in the form of messages from the state processor 102 and provide control signals to one or more associated projectors 114. FIG. 1 shows an exemplary software architecture 130 of an application processor. The software architecture 130 includes core components 132 and an application layer 134. The core components 132 are aspects of the software architecture 130 that are shared by all developers preparing software applications for the application processor 116. Examples include input/output drivers, storage and retrieval routines and other operating system components. The application layer 134 includes functions, routines and other components which are customized by each developer of software for the application processor 116 to create a unique application behavior for the application processor.

The application layer 134 includes a message handler 136 and one or more objects 138. The message handler 136 communicates with the state server 102. In particular, the message handler 136 receives messages 140 from the state server 102 which define changes in the system 100 for processing by the respective application server. Further, the message handler sends messages 142 to the state server which define changes in the system produced at the respective application server and which should be reflected to other application servers 116. The messages are preferably formatted in accordance with a predefined data transmission protocol, including, for example, a header with source and destination addresses and a payload including data defining a change of state in the system. However, any suitable data transmission format may be substituted.

The objects 138 are instantiated by the developer of the application layer 134. Objects are discrete items that can be selected and maneuvered, such as an onscreen graphic. In object-oriented programming, objects include data and the procedures necessary to operate on that data. Operation of the application processor 116 under control of the application layer 134 may cause the objects to be generated and to operate. In the illustrated example, the objects 138 include their own message handlers to communicate with other portions of the application layer and the state server 102. Messages communicated by the objects 138 may receive updates to the system state that affect in individual object or may contain information about a changed detected or produced by the object that should be reflected by the state server 102 to the other application processors 116.

In accordance with the present invention, the architecture exemplified by FIG. 1 supports a shared state among multiple processors, such as the application processors 116, and multiple applications active on the processors 116, such as the application layer 134. Operation of the state server 102 ensures that the states of the application processors 116 are synchronized. In other words, the state server 102 operates to ensure that all state changes are reflected to all processors 116 as simultaneously as possible.

Synchronization in the present context means, most generally, that the state of each application processor is identical, to the extent that the states include the same information. For application processors running local copies of the same application program, the states are identical when each copy of the application has identical data. There may be variations in the respective applications. For example, in the specific example described herein, two or more application processors produce portions of an image on a display. Each processor is assigned to display a designated portion, referred to herein as its context, of the overall image. However, each processor maintains the data necessary to produce the entire image, not just its context. Data which are not part of the context are updated based on processing of the application and based on synchronization information received from the state server, so that the local copy of the application is synchronized or contains the same data as other copies which have other contexts.

In the present application, synchronization is not just synchronization in time. All synchronization involves a common framework. Synchronization relates to the local state or states of the application processors.

In a first example, time synchronization involves the server sending a message to all applications specifying the current time, for example, because the server accessed the system clock, which may be considered a time sensor. In response to this message, some applications on some of the application processors might simply update an animation. Others might perform some logic to map the new time to a higher level state change (e.g., to an indication that it is time for a train to arrive) and use the architecture to reflect that new state to the other applications. Other applications on other processors may not have any time-dependent aspects and so have no response to the message. Different applications respond to the reported state change appropriately.

In a second example, a train has a global positioning system (GPS) receiver, which forms a position sensor, and an application processor of the type described herein. The train and its application processor send a message reporting the GPS position data as the new state of the train. The message is received at the state server and is reflected to several other rail yard applications. For example, in a rail yard command center, the information in the message effects a change in a display of train position. In a computer room with data processing equipment, the message is handled with a database entry. In the rail yard, another application on another processor opens a gate.

In a third example, a touch screen sensor detects the location of a touch and reports the location to the state server. The server sends information about the state change to all applications in the system. One application maps that state change to a higher level state, "a button has been pressed." Another application maps the touch to a different higher level state, "there is human activity in the command center." Again, each application receives the same state update message and responds appropriately.

In each of these examples, time is handled in conceptually the same way as any other state change. Touch, motion, and any other sensor input to the system, such as swiping an identification card in a card reader or using a fingerprint reader are reported to the state server and are all handled the same way, appropriately for each application processor in the system. State changes are not necessarily handled homogeneously. One application might simply update a display. Another might actuate a robot.

Referring again to FIG. 1, in the most general applications, state changes are effected from a variety of sensors and/or program logic and are not limited to user interactions. Any information about a change of state is passed to the state server 102 which mirrors or re-transmits the information to others in the system 100, including the application processors 116. The application processors 116 or any other output devices 104 receive the updated state information from the state server and respond appropriately. The response might be to update data stored at the output device 104. The response might be to change a displayed image or program state. The response might be to provide some suitable actuation. In the most general case, the response of each output device is tailored to the nature of its operation or function and the updated state information.

In the particular application illustrated in FIG. 1, in which the output devices 104 include projectors 114 under control of application processors 116, state changes are effected from the input devices 108 or program logic operating on an application processor 116. In response to an input signal detected by the I/O processor 106, the state server 102 updates its state information and mirrors or re-transmits the information to others in the system 100, including the application processors 116. That is, each application processor 116 is configured to dispatch an update message to the state server 102 in response to processing an application program to produce a change in the image forming the respective display portion produced by the application processor. The state server 102 reflects the message to other application processors 116. The application processors 116 receive the updated state information from the state server 102 and respond appropriately. In this specific application of FIG. 1, the response of each application processor 116 is to change the display produced on its associated display screen 118.

In this particular embodiment, the cameras 120 positioned adjacent the display surface 120 operate as input detectors positioned to detect user activations occurring adjacent to one of the display devices formed by the display panels 118. In response to the detected user activations, the input detector or camera produces user activation signals. For example, the signals might be digital data defining the location in x and y coordinates where a user's hand is located at the surface of the display panels 118. The I/O processor 106 is in data communication with the input detectors formed by the cameras 120 and the state server 102 to convey information about the user activation signals. For example, the I/O processor may simply provide the x and y coordinate data, or the data may be enhanced or formatted with other information.

Further in the particular embodiment described herein, each of the application processors 116 runs substantially the same program, or identical application programs. Each application processor 116 maintains its own copy of the state of the system 100, updated in response to state messages received from the state server 102. Based on its local copy of the system state, each application processor 116 displays in predefined display portions on separate display devices 112 an output display of the application programs. The processing of the applications is synchronized by the state server 102 operating as a synchronizer. In this system, each respective application processor 116 controls a respective display device 112 for displaying a respective display portion of the output display on the respective display device 112.

When a user interaction (such as a hand near a display panel) is detected, at a respective application processor associated with the respective display device, the display is updated on the respective display portion. The state server as synchronizer conveys information about the user interaction to each of the respective application processors, each of which has all of the system data. However, each of the application processors is responsible for displaying its respective display portion. Therefore, an application processor updates its display portion only if the user interaction affected that display portion. For example, if a user moves a hand near the left-most panel of a 2×4 panel display in which each panel is controlled by its respective processor, the user interaction represented by the hand movement is reported by the state server to all processors. However, only the processor controlling the left-most panel changes the display produced on that panel to reflect the user interaction. All other displays remain unchanged, although all other processors have identical data matching. Each processor maintains its own context and updates its display only if the context has changed, requiring an update. The context information defines what display portion of the overall display is produced by the processor. In the same way, if a user interaction requires a change in the display to more than one display panel (e.g., because a new application window is opened on the display), the state of the system will reflect the changes to each respective context of each application processor that is affected. Because of the change within the context of the application processor, the processor's display is updated.

Figure 2:
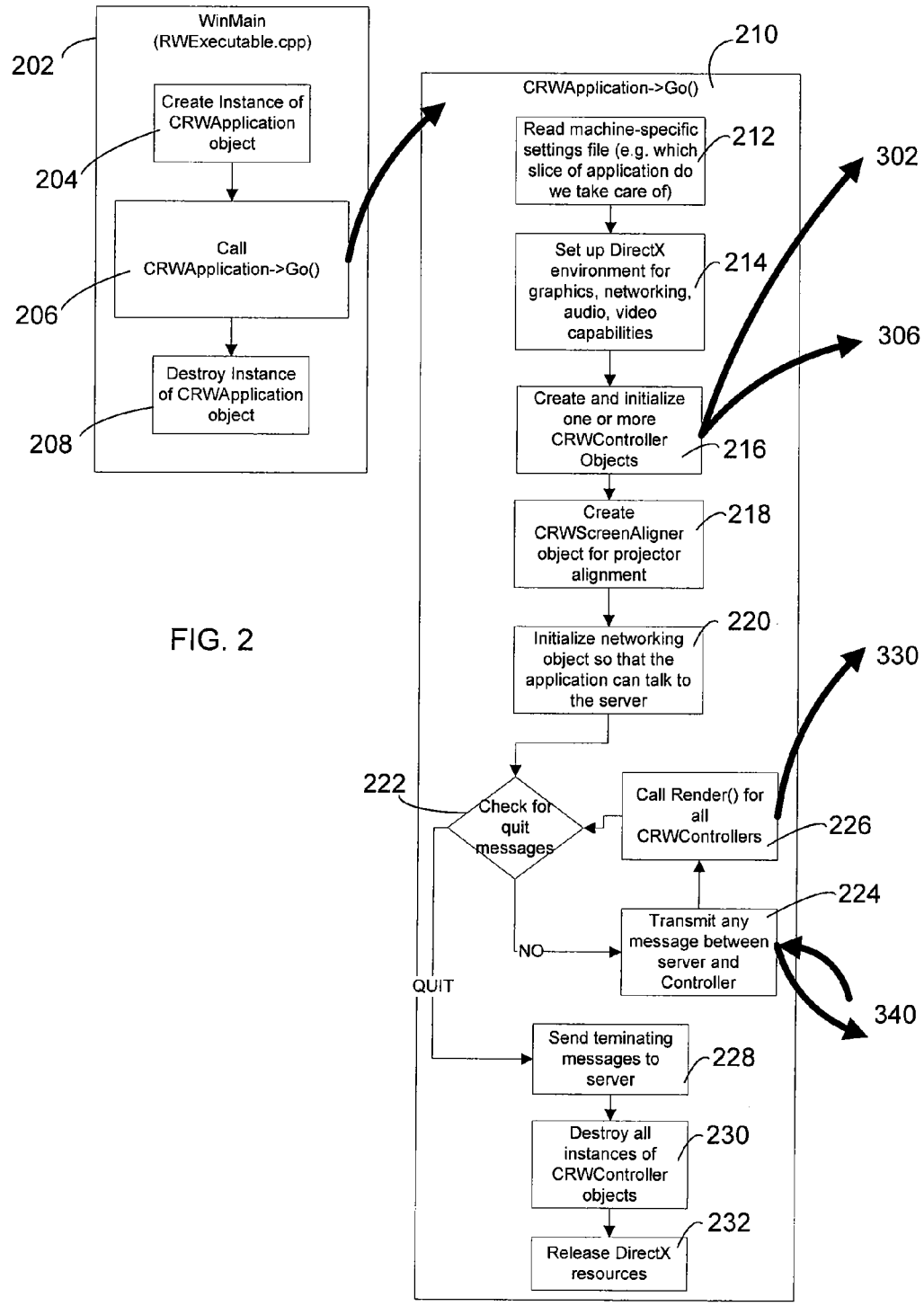
FIG. 2 is a flow diagram illustrating process flow in the system of FIG. 1.

FIG. 2 is a flow diagram illustrating process flow in the system of FIG. 1. In particular, FIG. 2 illustrates the particular embodiment of the system of FIG. 1 in which information is displayed and presented using a group of independent and synchronized application processors. Other methods of implementing the system of FIG. 1 may be substituted and variations on this embodiment may be readily deduced.

In FIG. 2, the process is implemented as computer code, in this example, a C++ code portion 202 entitled RWExecutable.cpp. The code portion 202 first creates an instance of an object called CRWApplication, block 204. The code portion 202 then calls the newly-created object, block 206. As is indicated by the line in FIG. 2, control then transfers to a code portion 210 which is the instantiation of CRWApplication. After processing of the code portion 210, the instance of CRWApplication is destroyed, block 208, by code portion 202.

Code portion 210 is an instantiation of the C++ object CRWApplication. This object handles setting up the graphics environment for applications in the system of FIG. 1. This object also initializes and maintains a list of all CRWController defined in the application, as will be described in further detail below. Contents include CRWScreenAlignmentObject, in case the application needs to be displayed through a multi-projector system.

The code portion or application 210 implements the flow diagram illustrated in FIG. 2. At block 212, the application 210 reads any files containing machine-specific settings. Examples of such settings include defining which slice of the or respective display portion this machine is responsible for processing. More broadly, the machine-specific settings define what output device is to be controlled by the machine. The output device may be a display device, an actuator or any other appropriate device.

At block 214, the application 210 sets up the DirectX environment for any required graphics, video, networking or audio capabilities. DirectX is a library for accessing several low-level functions such as networking, graphics, input, audio, and video. The system of the illustrated embodiment uses the graphics library most extensively, but the networking library is used for communication.

At block 216, the application 210 creates and initializes one or more CRWController objects. A controller object is a list of objects and the logic to send and receive messages from them. At block 218, the application 210 creates an object called CRWScreenAligner. This is an object that allows for use of a multi-projector tiling system in which the display of the application is spread seamlessly across a number of projected areas. By distorting the display output that is actually sent to the projector, this object corrects for the distortion of the projector, minimizing the seams between projection areas. The exact character of the correction is entirely user configurable through this object. At block 220, the application 210 initializes a networking object. This object allows the application processor to communicate over a network with other devices including the state server.

At block 222, the application 210 checks for quit messages or other data indicating the application should be terminated. If no such a message is received, at block 224 any pending message is transmitted from the application processor to the state server. At block 226, an object called Render is called to render an image on the display. Control remains in a loop including blocks 222, 224, 226 until a quit message is received. In response to a quit message, control proceeds to block 228 where the application 210 sends terminating messages to the state server to discontinue communication with the state server. At block 230, the application cleans up by destroying all instances of CRW-Controller objects which have been created by the application. At block 232, all DirectX resources are released and the application terminates.

Figure 3:
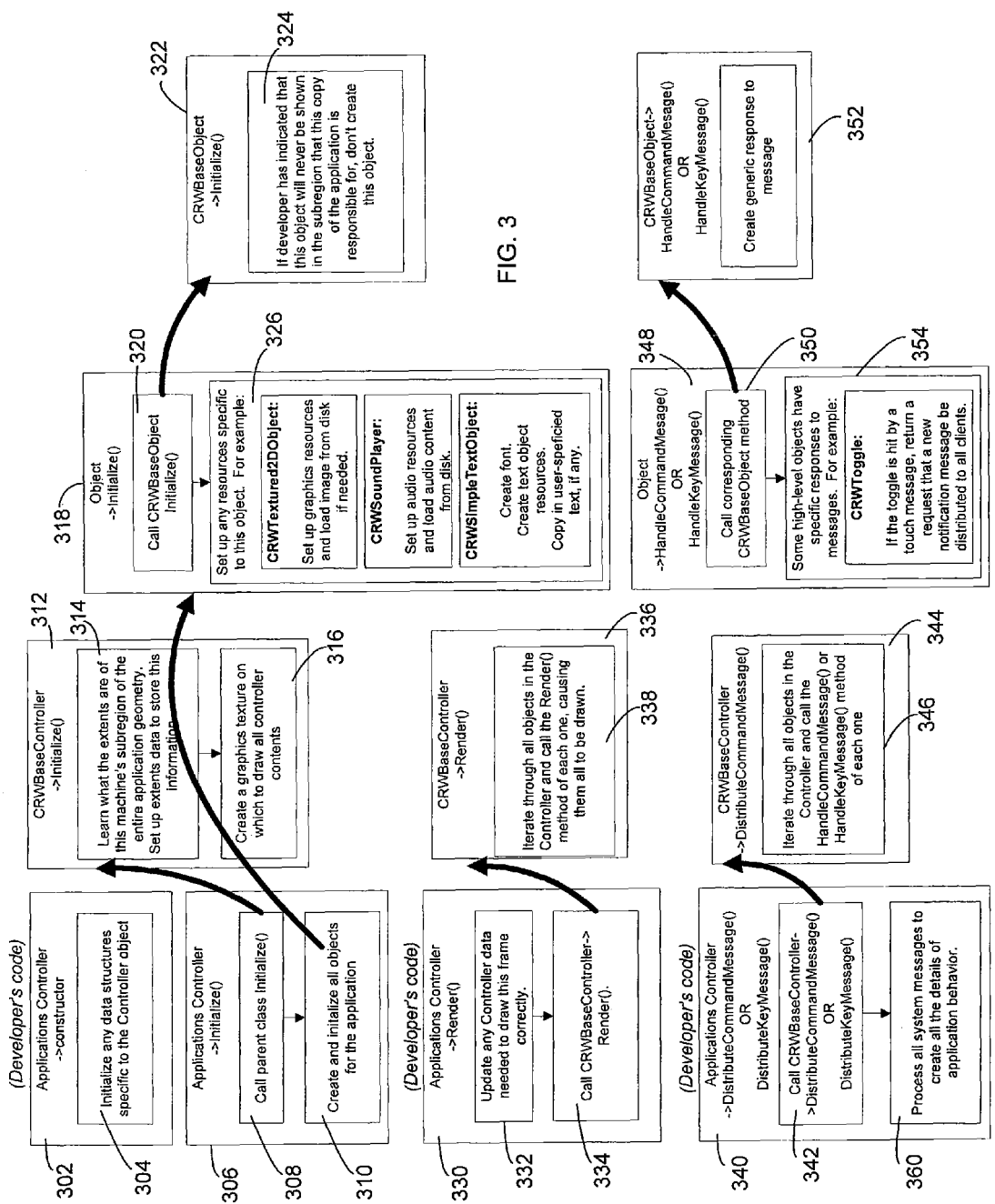
FIG. 3 is an architecture flow diagram for one software embodiment of the system of FIG. 1.

FIG. 3 illustrates is an architecture flow diagram for one software embodiment of the system of FIG. 1. FIG. 3 illustrates operations resulting from actions occurring in the flow diagram of FIG. 2. In response to block 216, FIG. 2, code portion 302 is called to initialize any data structures which are specific to the Controller object, block 304. Also in response to block 216, code portion 306 is called to create and initialize all objects required for the application, blocks 308, 310.

Block 308 instantiates an interface 312 called CRWBaseController. CRWBaseController is an interface that defines the basic properties of a Controller object. Controllers contain a list of objects derived from CRWBaseObject, and the logic to send and receive messages from them. CRWBaseObject is an interface that defines the properties of a general object, such as a piece of text (a CRWSimpleTextObject), a picture (a CRWTextured2DObject), or a webcam feed (a CRWWebCamObject). Objects are created and maintained by Controllers. Objects have the ability to initialize, to draw their own contents every frame, and they can also respond to messages from the Controller to write an application in the system. The developer must write a class that inherits from, and implements, the CRWBaseController interface. The developer fills the Controller with objects, and by specifying logic of the objects, they define what the contents and the behavior of the application will be. Specifically, the CRWBaseController interface allows the application processor to learn the extents of the sub-region or respective display portion of the entire output display or application geometry, and set up extents data to store this information, block 314. These extents are also referred herein as the context for this application processor. Also, block 316, the CRWBaseController interface creates a graphics texture on which to draw controller contents.

Block 310 creates and initializes all objects for the application. In response to block 310, an object 318 is initialized. At block 320, an object CRWBaseObject 322 is called. As noted above, CRWBaseObject defines the functionality of a general object (for instance the general idea that objects are "rendered"). Pictures, videos, etc. (CRWVideoObject and others as described herein) inherit from and extend the base object (for instance, defining how that particular type of object is rendered). Thus, CRWBaseObject defines the basic set of commands all objects understand (Initialize, Render, etc.) and each object type defines how objects respond to those commands. This allows the controller to send commands to objects without needing to understand what they are exactly. The controller operates in terms of CRWBaseObjects, but each specialized object responds with specialized behavior.

The object is created and initialized at block 322. However, in block 324, if the application developer has indicated that this object will never be shown in the sub-region or respective display portion for which the copy is responsible, creation of the object is suppressed.

Referring again to block 318, following initialization of the CRWBaseObject at block 320, at block 326 any resource specific to the current object are initialized. A first example is a CRWTextured2DObject, which is a rectangle in two dimensional space, defined by two corner points. The rectangle can have a simple color, or it can hold an image (a "texture"). Available options include setting the color value of the object, rotating it, resizing it, setting its position, changing its transparency. Other similar examples include the following:

CRWLineObject, which is a line in two dimensional space, defined by two endpoints. The thickness and type of the line can be set, in addition to all the properties and settings that apply to CRWTextured2DObjects;

CRWMagLine, which is a polygon in two dimensional space, defined by four corner points. This allows more flexible geometry than a CRWTextured2DObject and is used mostly for visually connecting zoomed areas to unzoomed areas;

CRWWebCamObject which is a rectangle in two dimensional space, defined by two corner points. The object displays a continuous feed of images fetched from a server or webcam.

CRWVideoTexture which is an object that handles taking video from a file and writing it to a texture, and the associated operations on that file such as decompression.

CRWVideoObject which is similar to a CRWTextured2DObject, but holds a video clip (see CRWVideoTexture) instead of a still image.

CRWCompoundObject, which is an object that contains and manages a collection of objects, and draws the collection to a 2D texture, which can then be drawn onscreen. Compounded in this way, the objects in the collection can all share a coordinate system separated from the global coordinate system. Changing the location, scale, rotation, color, etc. of the compound object causes a proportionate change for all sub-objects.

CRWSimpleTextObject which is a chunk of text. Settings include size and shape of bounding rectangle, font height and width, color and transparency, and some formatting options (e.g. left and right justification).

CRWSpriteScatter, which is a collection of points in space, like pushpins on a map. The scale of the collection can be set by the user to any value. Each point in the collection can have a certain size and, optionally, hold an image. All the points have the same image; in this context, the images are called "sprites". Positions of the points can be read from a bitmap image, allowing the developer to position them visually.

CRWVideoSpriteScatter, which is similar to the CRWSpriteScatter, but each point can hold a video image, instead of a still image.

CRWStencilController. Stencils are used to define where objects are and aren't drawn. CRWStencilController is an object that defines a stencil and the various objects which are subject to that stencil. The object contains two lists: objects to be used as stencils, and drawn objects.

CRW3DObject, which is analogous to a CRWTextured2DObject, but its vertices occur in three dimensional space, and there can be many of them. Object knows how to load vertex lists from a file, and do three dimensional lighting and transformations.

RW3DRenderObject, which is an object that contains and manages a collection of three dimensional Objects in a scene, and draws that scene to a two dimensional texture, which can then be drawn onscreen.

RW3DBillBoardObject, which is an object that creates a two dimensional object in a three dimensional world, and dynamically updates its orientation so that it always faces the viewer.

CRWSoundPlayer, an object that is tied to an audio file on disk. Methods include play, pause, stop, etc.

CRWDataBundle, an object for holding data in row-and-column format. Data can be inserted functionally by the user, or can be loaded from a properly formatted text file. Data contents can also be written to a formatted text file. CRWDataBundles can be used to provide a set of data for display by an implementer of the CRWChart interface (such as CRWPieChart).

CRWChart, an abstract class (or interface) that defines the properties and methods which all chart objects have in common, including their data underpinnings.

CRWPieChart, a pie chart object, implementing the CRWChart interface. Data contents are defined with a CRW-DataBundle.

CRWLineChart, a line chart object, implementing the CRWChart interface. Data contents are defined with a CRW-DataBundle.

CRWBarChart, a bar chart object, implementing the CRWChart interface. Data contents are defined with a CRW-DataBundle.

CRWScatterPlotChart, a scatter plot chart object, implementing the CRWChart interface. Data contents are defined with a CRWDataBundle.

CRWToggle, an object that acts as a button when placed in the context of the touchscreen messaging system. The object listens for touch messages within a coordinate range which corresponds to its boundaries; when triggered, it raises some preset message, which is passed to the server and rebroadcast to all machines on the network, alerting everyone to the state change. The object knows its own state, and also controls how often it can be triggered.

CRWWhiteboardObject, an object that holds a collection of lines or dots arranged on a two dimensional surface. These lines or dots represent "marks" on a whiteboard. Marks can be added to or subtracted from the whiteboard by the user of object.

CRWValueInterpolatorObject, an object which acts like a stopwatch. It is initialized with a start time, a duration, and a starting and stopping value. Over that duration of time, it takes the start value and changes it into the stopping value (i.e. it "interpolates" the value). Objects and Controllers use this object to help them do animation smoothly.

CRWBezierInterpolatorObject, which is similar to CRWValueInterpolatorObject, but uses a specialized Bezier function to interpolate.

At FIG. 2, block 226, a routine Render( ) was called for all CRWControllers. In this case, control proceeds to the developer's code at block 330, FIG. 3. There, the applications controller updates an Controller data needed to correctly draw the frame, block 332, and instantiates a CRW-BaseController object to render the frame, block 334. The CRWBaseController instantiation 336 iterates through all objects in the controller and calls a Render( )method for each object, block 338. This causes all objects to be drawn.

At FIG. 2, block 224, messages were transmitted between the state server and the Controller. In this case, control proceeds to the developer's code 340. The code 340 processes a DistributeCommandMessage or a DistributeKeyMessage. At block 342, the CRWBaseController 344 for the message type is called. This object iterates through all objects in the Controller and calls the appropriate object 348 to handle the message for each object, block 346. Thus, the object 348 at block 350 calls a corresponding CRWBaseObject method, block 352, and processes specific responses associated with some high-level objects, block 354.

After the developer's code 340 processes block 342, at block 360, all system messages are processed to create the details of the behavior of the system.

From the foregoing, it can be seen that the presently disclosed embodiments provide system and method for distributed information processing and interaction. In one general embodiment, application processors respond to one or more software applications to produce outputs, the respective outputs together forming a system output. Each change in state of an application processor is reported in a state change message to a state server which reflects the message to all other application processors in the system. Also, any system inputs are reported to the state server which again reflects the state change to all application processors. In this way, the application processors are maintained in synchronous states. Output changes in one processor that should be reflected in the outputs of other processors are done so, automatically and seamlessly.

In a specific embodiment, each application processor drives a display device which produces one image tile of a tiled output display. Each processor uses the state change messages from the state server to update state information for the entire display, even though the processor is responsible for displaying only a designated portion of the display. The assigned, designated portion of the display is the context of the processor. An input device detects user interaction with the display, similar to mouse movements and mouse clicks but, in one embodiment, hand motions in front of the display. Detected user interactions are reported to the state server and information about the user interactions is reflected from the state server to the application processors which produce the image. The image is updated based on the information from the state server.

It is therefore intended that the foregoing detailed description be regarded as illustrative rather than limiting, and that it be understood that it is the following claims, including all equivalents, that are intended to define the spirit and scope of this invention.

The invention claimed is:

1. A system for a multi-processor controlled interactive environment comprising:
   a plurality of output devices arranged to produce a system output, wherein each of the plurality of output devices produces a respective output portion of the system output, the system output being an aggregate of the respective output portions of all of the plurality of output devices;
   a plurality of application processors, each of the plurality of application processors configured to process one or more respective application programs, each of the plurality of application processors coupled with an associated respective output device of the plurality of output devices for controlling the associated respective output device in producing the respective output portion of the system output, wherein each change or output produced by each of the plurality of application processors is a local change in state of the application processor and each of the plurality of application processors automatically generates a local state change message based on the local change in state of the application processor and sends the automatically generated local state change message to a state server;
   the state server in data communication with the plurality of application processors that provides shared state information to all of the plurality of application processors, the shared state information including system inputs and all local change in state information received by the state server in the automatically generated local state change messages from the plurality of application processors, wherein all of the plurality of application processors receives the shared state information from the state server,
   wherein in instances when the received shared state information affects the respective output portion of the system output, each of the plurality of application processors controls the associated respective output device to change the respective output portion of the system output, the system output comprising the aggregate of the output portions of all of the plurality of output devices; and
   in instances when the shared state information does not affect the respective output portion of the system output, each of the plurality of application processors controls the associated respective output device to maintain the respective output portion of the system output unchanged.

2. The system of claim 1 wherein the plurality of output devices comprises one or more display devices arranged to display respective display portions of an output display of the system.

3. The system of claim 2 wherein the plurality of application processors are each associated with one of the one or more display devices to control the associated display device in forming an image of a respective display portion of the system.

4. The system of claim 1 further comprising:
   input detectors positioned to detect one or more user activations and produce user activation signals in response thereto; and
   an input processor in data communication with the input detectors and the state server to convey information about the user activation signals for processing by the state server.

5. The system of claim 1 wherein each application processor is configured to dispatch an update message to the state server in response to processing the respective application program to produce a change in the associated respective output device, and wherein the state server reflects the update message to other application processors.

6. The system of claim 1 wherein the state server is configured to synchronize system information at each of the plurality of application processors so that application processors processing identical application programs have substantially the same program state.

7. The system of claim 6 wherein the state server is configured to send synchronize messages to the plurality of application processors to update the system information at each of the plurality of application processors.

8. The system of claim 6 wherein the state server maintains time synchronization of the system information.

9. A method for a multi-processor controlled interactive environment comprising:
   processing on a plurality of separate application processors substantially identical application programs, wherein each of the plurality of separate application processors is associated with a respective output device of a plurality of output devices;
   synchronizing the processing of the application programs in a synchronizer, the synchronizer maintaining a common state which is indicative of present local states of all of the plurality of separate application processors and providing update messages to the all of the plurality of separate application processors in response to changes to the common state, and at each of the plurality of separate application processors;
   producing respective outputs of the application programs by respective application processors of the plurality of separate application processors, the respective outputs in aggregation forming a system output, the plurality of separate application processors each updating a local state in response to receiving the update messages from the synchronizer, each of the plurality of separate application processors automatically providing local state change messages to the synchronizer based on any local state change at the application processor;

wherein in instances when information in an update message affects respective output of an application program at a respective application processor, the respective application processor controls the associated respective output device to change the respective output, the respective outputs of the plurality of output devices in aggregation forming the system output; and in instances when the information in an update message does not affect the respective output of the application program at the respective application processor, the respective application processor controls the associated respective output device to maintain the respective output unchanged; and changing the common state at the synchronizer based on the local state change messages from all of the plurality of separate application processors.

10. The method of claim 9 wherein synchronizing comprises reflecting information contained in the state change messages received at the synchronizer to the plurality of separate application processors so that all of the plurality of separate application processors have the common state.

11. The method of claim 10 wherein synchronizing comprises maintaining a common time state among the synchronizer and the plurality of separate application processors.

12. The method of claim 10 wherein synchronizing comprises maintaining a common data state of input data and application output data among the synchronizer and the plurality of separate application processors.

13. The method of claim 9 wherein producing respective outputs of the application programs comprises, at each respective application processor, controlling a respective display device to display a respective display portion of an output display on the respective display device.

14. The method of claim 9 further comprising:
at a respective application processor of the plurality of separate application processors,
detecting user interaction with a respective application program at the respective application processor,
updating a respective output of the application programs in response to the user interaction, and
conveying information about the user interaction to the synchronizer; and
conveying synchronization information about the user interaction from the synchronizer to other respective application processors associated with the other respective display portions.

15. The method of claim 14 further comprising:
at each respective application processor of the plurality of separate application processors,
controlling an associated respective display device to display a respective display portion of an output display on the respective display device, in response to the user interaction,
determining if the user interaction should change the respective display on the associated respective display portion; and
if so updating the display on the respective display portion.

16. The method of claim 15 wherein detecting user interaction comprises detecting a plurality of substantially simultaneous user interactions with the respective display portion.

17. The method of claim 15 wherein detecting user interaction comprises at least one of:
detecting a manual motion in front of a display screen of the respective display portion,
detecting a user touch of a touch screen of the display screen of the respective display portion,
detecting absence of a user touch of a touch screen where there previously was a user touch.

18. The method of claim 15 further comprising:
if necessary based on the synchronization information,
updating the display on one or more of the other respective display portions in response to the user interaction.

19. The method of claim 15 further comprising:
receiving the synchronization information at another respective application processor; and
if the user interaction should change the display portion associated with the other respective application processor, updating the display portion.

20. A system for a multi-processor controlled interactive environment comprising:
a plurality of output devices and a plurality of respective application processors, wherein each of the plurality of respective application processors is coupled to a respective one of the plurality of output devices, the plurality of output devices arranged to produce together a system output,
the plurality of respective application processors each processing one or more respective local application programs and, in response thereto, producing respective local state changes,
each respective application processor and respective output device in combination producing only a respective designated portion of the system output, the respective designated portion being defined by context information known to the respective application processor,
the respective application processors each sending local state change messages automatically based on the respective local state changes, the local state change messages including information about the respective local state changes; and
a synchronization server in data communication with each of the plurality of respective application processors, the synchronization server receiving the local state change messages from each of the plurality of respective application processors defining a state change in a local state of each of the respective application processors when each of the plurality of respective application processors has a change in a respective local application program, and
reflecting the received local state change messages to all of the other respective application processors of the plurality of respective application processors so that the respective local application programs are updated to reflect the state changes of the received local state change messages;
wherein in instances when information in a reflected local state change message affects a respective designated portion of the system output, a respective application processor controls the respective output device to change the respective designated portion of the system output; and
in instances when information in the reflected local state change messages does not affect a respective designated portion of the system output, the respective application processor controls the respective output device to maintain the respective designated portion of the system output unchanged.

* * * * *